April 7, 1953 T. C. DINGMAN ET AL 2,634,148
ROTARY TYPE MOTOR VEHICLE DOOR LOCK
Filed April 22, 1950 2 SHEETS—SHEET 2
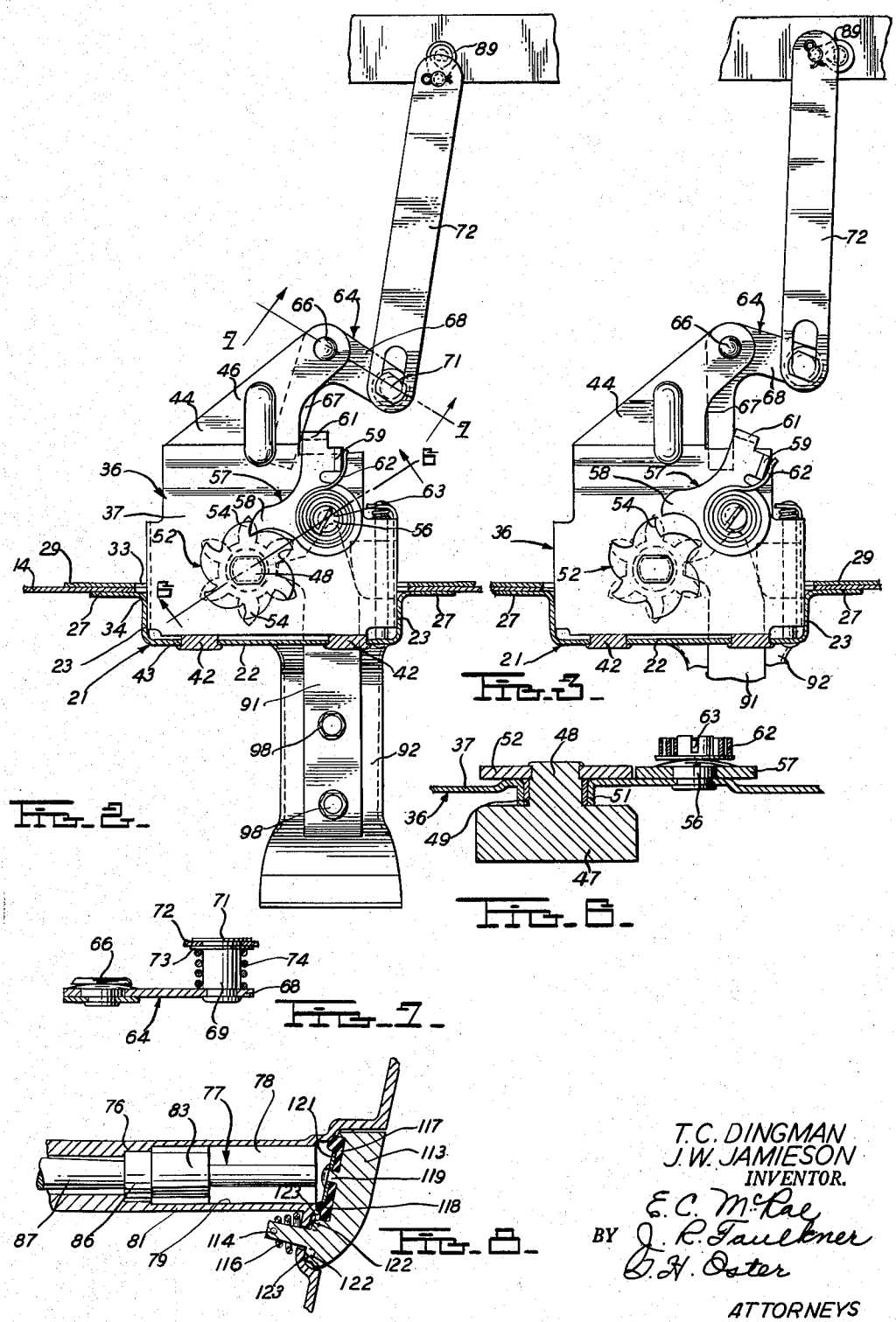
T.C. DINGMAN
J.W. JAMIESON
INVENTOR.
BY E.C. McRae
J.R. Faulkner
G.H. Oster
ATTORNEYS Patented Apr. 7, 1953

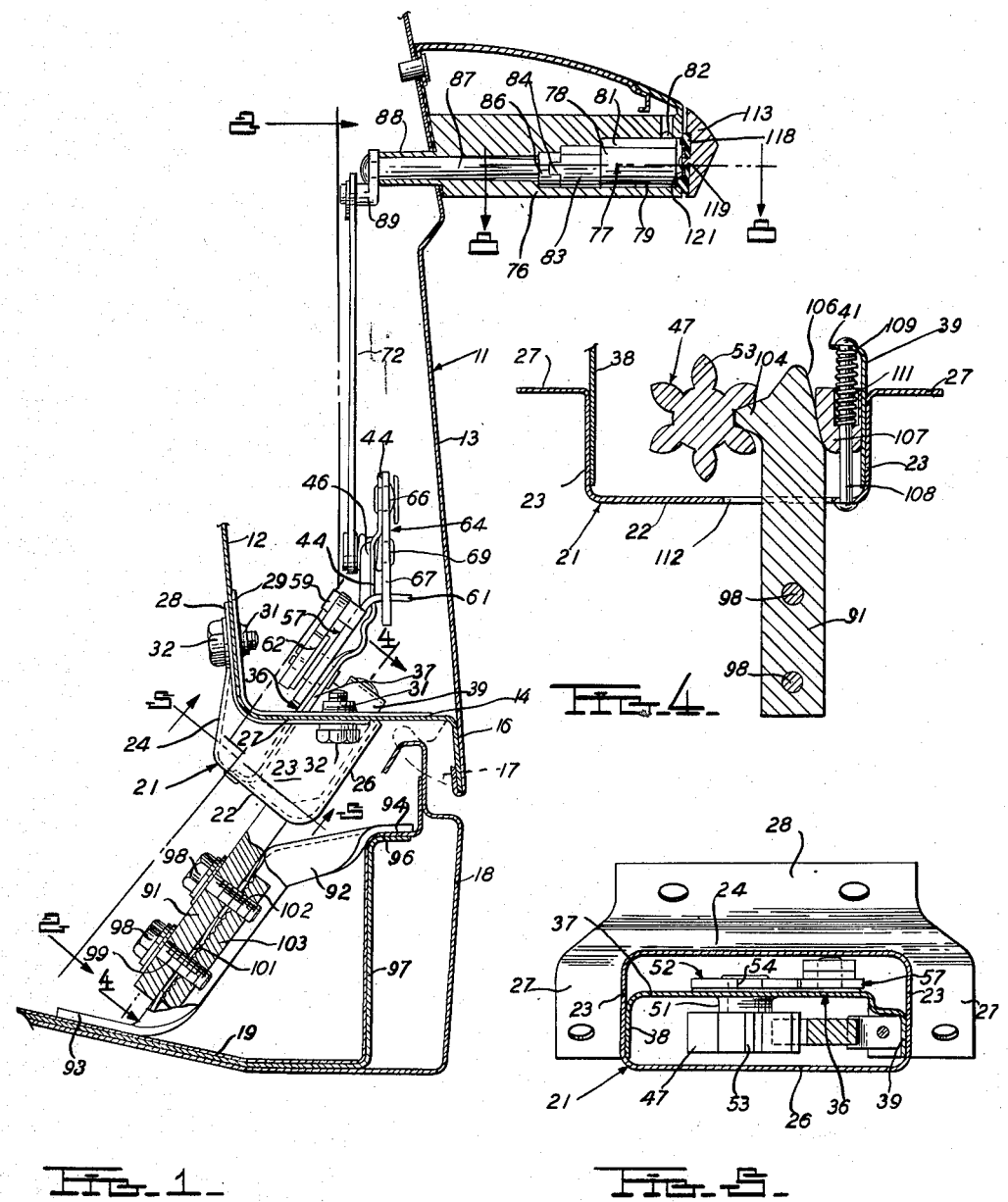

2,634,148

UNITED STATES PATENT OFFICE 2,634,148

ROTARY TYPE MOTOR VEHICLE DOOR LOCK

Thomas C. Dingman and John W. Jamieson, Dearborn, Mich., assignors to Ford Motor Company, Dearborn, Mich., a corporation of Delaware Application April 22, 1950, Serial No. 157,574

4 Claims. (Cl. 292—280)

1

This invention relates generally to latch mechanism for doors and particularly to latch mechanism of the rotatable bolt type for use on motor vehicle doors.

An object of the invention is to provide an improved door latch mechanism of the type having a rotatable bolt and a rotatable ratchet controlled by means of a pivotally mounted pawl, the latter being engaged by a suitable actuating member to release the ratchet and bolt so that the latter may be rotated to disengage the latch from the associated keeper. While the actuating member may be operated by a manually controlled handle, the latch mechanism is particularly designed so that it may be released simply by operation of a suitable key controlled device. Only a single operation is thus necessary to unlock and unlatch the door and a corresponding economy in construction is obtained.

Another object of the invention is to provide a door latch mechanism of the type briefly described above which is contained within a case especially designed to thwart unauthorized release of the latch mechanism.

Other objects and advantages of this invention will be made more apparent as this description proceeds, particularly when considered in connection with the accompanying drawings, wherein:

Figure 1 is a longitudinal vertical cross sectional view through the rearward portion of a motor vehicle body incorporating the latching and locking mechanism of the present invention, and showing the latter primarily in side elevation.

Figure 2 is a vertical cross-sectional view taken on the line 2—2 of Figure 1 and showing the latch mechanism in locked position.

Figure 3 is a view similar to Figure 2 but showing the latch mechanism in unlocked position.

Figure 4 is a cross-sectional view taken on the line 4—4 of Figure 1.

Figure 5 is a cross-sectional view taken on the line 5—5 of Figure 1.

Figure 6 is a cross-sectional view taken on the line 6—6 of Figure 2.

Figure 7 is a cross-sectional view taken on the line 7—7 of Figure 2.

Figure 8 is a cross-sectional view taken on the line 8—8 of Figure 1.

The drawings illustrate the latching and locking mechanism of the present invention as applied to the luggage compartment door of an automobile body, but it will be understood that the device is also applicable to the other doors and closure members of motor vehicles as well. In addition, the mechanism is constructed for direct release by means of a key-controlled device alone, but if desired it can be arranged to be operated by a manually operated handle.

The reference character 11 refers to the luggage compartment door of an automobile body. The door comprises inner and outer panels 12 and 13 respectively, the inner panel 12 having an outwardly extending lower flange 14 terminating in a downwardly extending flange 16 suitably secured to the lower edge of the outer door panel 13. A flexible rubber weather strip 17, shown in phantom in its free position in Figure 1, is suitably cemented to the flange 16 in position to engage the upper inturned edge of the rocker panel 18 suitably secured to and extending upwardly from the rearward portion of the floor panel 19 of the luggage compartment.

The latch mechanism is carried by a case 21 having a bottom wall 22, side walls 23 and front and rear walls 24 and 26 respectively. Horizontally extending flanges 27 extend laterally outwardly from the opposite sidewalls 23 of the case, and the rear wall 24 of the case merges into the generally upwardly extending flange 28. The flanges 27 and 28 are arranged to fit against and be secured to the vertical wall and the horizontal flange 14 respectively of the inner door panel 12.

An L-shaped reinforcing member 29 is located inside the door panel 12 and is provided with screw bosses 31 arranged to receive bolts 32 which extend through aligned apertures in the flanges of the case and the door panel to rigidly mount the case upon the luggage compartment door. As best seen in Figure 2, the reinforcing member 29 and the lower flange 14 of the inner door panel are provided with aligned rectangular openings 33 and 34 respectively through which the portions of the latch mechanism to be described hereinafter extend.

It will be noted from Figure 1 that the case 21, which is preferably formed as a one-piece stamping, effectively protects the latch mechanism from unauthorized operation. For example, even though a tool were forced through the clearance space between the door and the adjacent body panel by pushing aside the resilient weather strip 17, entrance to the interior of the case 21 and to the latch mechanism enclosed therein is blocked.

A bracket, indicated generally by the reference character 36, is mounted within the case 24 and forms in effect a partition wall between the front and rear walls 26 and 24 respectively of the case, The bracket 36, as best seen in Figures 2 and 5, is a stamping having a main body portion 37 forming the partition and provided with rearwardly extending side flanges 38 and 39 which are spot welded to the adjacent side walls 23 of the case. At its upper edge the flange 39 is formed with an inturned flange 41, Figure 4, for a purpose to be described later. The lower edge of the body portion 37 of the bracket is formed with downwardly depending offset lugs 42 which extend through elongated slots 43 in the bottom wall 22 of the case and are peened over to secure the bracket thereto. Although the main part of the body portion 37 of the bracket extends generally parallel to the rear wall 26 of the case, it will be seen from Figure 1 that the upper portion 44 thereof is bent to extend in a generally upward direction and is provided with a reinforcing rib 46.

The latch mechanism is provided with a rotatable toothed latch or rotor 47, Fig. 6, having an integral shank 48 rotatably mounted in a bushing 49 carried in an annular flange 51 struck out from the body portion 37 of the bracket 36. The end of the shank 48 of the rotor is flattened and extends through a correspondingly shaped aperture in a rotatable toothed ratchet 52 and is riveted thereto. It will be noted that the body portion 37 of the bracket is embossed adjacent the ratchet 52 to provide a bearing surface therefor.

The rotor 47 is formed with six equally spaced peripheral teeth 53 and the ratchet 52 is likewise formed with an equal number of teeth 54. It will be noted that the rotor and ratchet are thus mounted on opposite sides of the bracket 36 for rotation together as a unit.

A shoulder rivet 56, Figures 2 and 6, is mounted upon the body portion 37 of the bracket 36 and provides a pivotal mounting for a pawl 57. The pawl 57 is formed with three arms 58, 59 and 61, the arm 58 being engageable with the teeth 54 of the ratchet 52 to hold the ratchet and the rotor 47 locked against rotation in a clockwise direction as viewed in Figure 2. Arm 59 projects inwardly and upwardly from the pawl 57 and provides a bearing surface for the free end of a coiled spring 62, the inner end of which is anchored in a slot 63 formed in the end of the shoulder rivet 56. It will be seen that the spring 62 yieldably urges the pawl 57 into engagement with the ratchet 52. The pawl 57 is arranged to be rotated against the action of spring 62 by means of a bell crank actuating lever 64 pivotally mounted upon a shoulder rivet 66 carried by the upper end of the upper portion 44 of the bracket 36. The lower arm 67 of the bell crank lever is arranged to engage the rearwardly bent arm 61 of the pawl 57 to actuate the latter. The other arm 68 of the bell crank lever, as best seen in Figure 7, has riveted thereto a shoulder stud 69 provided with an enlarged head 71 at its opposite end. Opposite sides of the head 71 are flattened, as seen in Figure 2, so that the lower slotted end of a link 72 can be slipped over the head of the stud and rotated into assembled position. The link 72 is held resiliently between the head 71 of the stud and a washer 73 by means of a spring 74 surrounding the shank of the stud 69.

Figures 1 and 8 show the key controlled locking device for actuating the link 72 to release the latching mechanism. A bracket 76, preferably in the form of a die casting, is suitably mounted upon the outer panel 13 of the luggage compartment door, extending generally rearwardly from the central portion thereof. This bracket not only houses a light (not shown) arranged to illuminate the license plate mounted directly therebeneath, but also houses the key controlled lock indicated generally by the reference character 77. The lock comprises a lock casing 78 mounted in the bore 79 provided in the bracket 76 and is held against turning by means of a rib 81 received within a corresponding groove in the bracket. Longitudinal movement within the bracket is provided by means of a lug 82 extending upwardly from the rib 81.

Rotatably mounted within the lock casing 78 is a lock cylinder 83 adapted to be rotated within the casing by the insertion and operation of the proper key. This construction is conventional and consequently is not shown in detail. The rearward end of the lock cylinder 83 is formed with a projecting tongue 84 adapted to be received within a corresponding notch in the head 86 of an extension member 87. The rearward end of the extension member 87 is journaled in an extension 88 of the bracket 76 which projects through an opening in the panel 13. A flattened portion is provided on the rearwardly projecting end of the extension member 87 and engages a correspondingly shaped opening in the upper leg of a crank 89. It will be apparent that rotation of the lock cylinder 83 by the key is effective to rotate the extension member 88 and the crank 89.

The crank 89 is shown in Figure 2 in locked position and it will be noted that in this position the coiled spring 62 holds the pawl 57 in engagement with one of the teeth 54 on the ratchet 52. Rotation of the lock cylinder in a clockwise direction, as seen in Figures 2 and 3, is effective to rotate the crank from the position shown in Figure 2 to that shown in Figure 3, and to raise the link 72 and swing the bell crank lever 64 in a counterclockwise direction about the pivot provided by the rivet 66. Inasmuch as the downwardly depending arm 67 of the bell crank 64 is in engagement with the arm 61 of the pawl 57 this actuation results in swinging the pawl in a clockwise direction against the action of the coiled spring 62 to the position shown in Figure 3. It will be seen that in this position the arm 58 of the pawl is moved out of engagement with the teeth 54 of the ratchet 52, thus unlocking the ratchet and the rotor 47 connected thereto and permitting free rotation of the latter.

In the illustrated embodiment of the invention the rotor 47 is adapted to be engaged by a keeper 91. As best seen in Figure 1, the keeper 91 is mounted upon a bracket 92 having upper and lower flanges 93 and 94 spot welded respectively to the floor panel 19 of the luggage compartment and the flange 96 extending upwardly from the rearward end of the panel 19. A reinforcing member 97 is provided beneath the panel to strengthen the latter.

The keeper 91 is bolted to the bracket 92 by a pair of bolts 98 extending through apertures 99 in the keeper and slots 101 in the bracket and into threaded holes 102 formed in the serrated clamping plate 103. It will thus be seen that the keeper is mounted upon a rigid support but can be adjusted vertically to accommodate manufacturing variations and to permit the proper engagement between the keeper and the rotor.

Referring now to Figure 4, the opposite end of the keeper 91 is formed with a tooth-like projection 104 adapted to engage the rotor 47 between adjacent teeth 53. Opposite the projection 104 the keeper is provided with a cam face 106 engageable with a wedge 107 mounted for sliding movement along the flange 39 of the bracket 36. A pin 108 extends between the bottom wall 22 of the casing and the inturned flange 41 of the bracket to provide a guide for the sliding movement of the wedge. A coil spring 109 surrounds the upper end of the pin 108 and extends into a recess 111 formed in the wedge to continually urge the wedge downwardly.

It will be seen that with the above-described construction the closing movement of the luggage compartment door causes the projection 104 on the keeper to engage the rotor 47 and rotate the latter until the locking position shown in Figure 4 is reached. In this position the rotor is locked by reason of the engagement between the ratchet and the pawl.

Conversely, when the pawl is released from the ratchet by the unlocking of the key controlled locking device 77, as described above, the ratchet and rotor are free to rotate permitting the luggage compartment door to be freely raised and the keeper withdrawn from engagement with the rotor.

It will be noted that a rectangular opening 112 is formed in the bottom wall 22 of the casing 21 of sufficient size to permit the entry and withdrawal of the keeper 91 from the casing.

The open end of the bore 79 formed in the bracket 76 housing the locking device 77 is arranged to be closed by a cover member 113. The cover member 113, as seen in Figure 8, is provided with an integral stud 114 extending through an opening formed in the bracket and resiliently urged toward the bracket by means of a coil spring 116. The cover member 113 is provided with an annular recess 117 within which is seated a resilient sealing gasket 118. The gasket is held in place upon the cover member by means of an integral stud 119 projecting through the gasket with its inner end peened over a washer 121 positioned on the face of the gasket. It will be seen that the enlarged rim of the gasket engages the corner of the opening provided in the bracket 76 for the locking device 77 and effectively prevents the entrance of water or dirt therein. Narrow ribs 122 project from the inner surface of the cover member 113 on opposite sides of the stud 114 and are arranged to be seated in V-shaped notches 123 provided in the bracket 76 when the cover is closed. It will be noted that when the cover is in its closed position the rib 122 farthest from the lock cylinder is in engagement with the bottom of the adjacent notch and that a small clearance is left between the rib and notch nearest the lock cylinder. This arrangement enables the spring loaded cover to fulcrum on the farthest notch and the gasket to be held tightly against the adjacent edge of the bracket. Upon initial pivotal movement of the cover member 113 to uncover the locking device and permit the key to be inserted therein the ribs 122 on the cover ride up the sides of the V-notches 123 and the cover member is shifted bodily outwardly so that the gasket 118 will be clear of the adjacent edge of the bracket. This permits the cover member to be opened freely and also prevents excessive wearing of the gasket which would otherwise be caused by the rubbing engagement between the gasket and the adjacent edges of the bracket.

It will be seen that the construction described above provides a simple yet effective latching device adapted to be released from locking engagement with its associated keeper simply by the usual operation of the key controlled locking device 77. While shown in connection with a luggage compartment door, it will be apparent that this mechanism is applicable to other doors of motor vehicles as well, and that the latching mechanism is suitable for use in connection with a manually operated handle of the conventional type as well as with the key release arrangement shown.

It will be understood that the invention is not to be limited to the exact construction shown and described, but that various changes and modifications may be made without departing from the spirit and scope of the invention, as defined in the appended claims.

What is claimed is:

1. A latch mechanism for a motor vehicle luggage compartment door having separated inner and outer panels and a jamb face at its free edge and arranged to cooperate with a fixed body structure upon which is mounted a keeper, comprising a dished housing open at its upper end and having flanges extending therefrom for attachment to the inner panel and jamb face of said door, an intermediate wall secured within said housing and adapted to extend through an opening in said jamb face into the interior of said door, a toothed ratchet rotatably mounted upon said wall on one side thereof, a pawl mounted on the same side of said wall and having an arm engaging said toothed ratchet to hold the latter in latching position, actuating means arranged to swing said pawl out of latching engagement with said ratchet, a toothed rotor mounted upon the opposite side of said wall and connected to said ratchet for rotation therewith as a unit, said housing having an integral bottom wall formed with an opening therein through which said keeper projects for engagement with the teeth on said rotor when the door is moved toward closed position.

2. A latch mechanism for a motor vehicle luggage compartment door having separated inner and outer panels and a jamb face at its free edge and arranged to cooperate with a fixed body structure upon which is mounted a keeper, comprising a dished housing open at its upper end and having flanges extending therefrom for attachment to the inner panel and jamb face of said door, an intermediate plate mounted within said housing and adapted to extend generally transversely of the plane of said door, said plate having end flanges secured to the end walls of said housing with the body portion of said plate adapted to extend through an opening in the jamb face of the door and to project into the interior of the door, a toothed rotor rotatably mounted upon said plate at one side thereof, said housing having an integral bottom wall formed with an opening therein through which said keeper projects for engagement with the teeth on said rotor when the door is moved toward closed position, a toothed ratchet within said housing on the opposite side of said plate from said rotor and mounted for rotation therewith as a unit, a pawl pivotally mounted on said plate on the same side thereof as said ratchet for holding said ratchet and rotor in locking position, and actuating means arranged to swing said pawl out of latching engagement with said ratchet to release said keeper and to permit said door to be opened.

3. A latch mechanism for a motor vehicle luggage compartment door having separated inner and outer panels and a jamb face at its free edge and arranged to cooperate with a fixed body structure upon which is mounted a keeper, comprising a dished housing open at its upper end and having flanges extending therefrom for attachment to the inner panel and jamb face of said door, an intermediate plate mounted within said housing and adapted to extend generally transversely of the plane of said door, said plate having end flanges secured to the end walls of said housing with the body portion of said plate adapted to extend through an opening in the jamb face of the door and to project into the interior of the door, a toothed rotor rotatably mounted upon said plate at one side thereof, a sliding wedge mounted for sliding movement within said housing on the same side of said plate as said rotor but spaced therefrom, spring means urging said wedge toward the bottom wall of said housing, said housing having an integral bottom wall formed with an opening therein through which said keeper projects for engagement with the teeth on said rotor and also with said wedge when the door is moved toward closed position, a toothed ratchet within said housing on the opposite side of said plate from said rotor and mounted for rotation therewith as a unit, a pawl pivotally mounted on said plate on the same side thereof as said ratchet for holding said ratchet and rotor in locking position, and actuating means arranged to swing said pawl out of latching engagement with said ratchet to release said keeper and to permit said door to be opened.

4. A latch mechanism for a motor vehicle luggage compartment door having separated inner and outer panels and a jamb face at its free edge and pivotally mounted upon a fixed body structure upon which is mounted a keeper, comprising a dished housing open at its upper end and adapted to project downwardly and inwardly from said jamb face and having projecting flanges adapted to be secured to the inner panel and the jamb face of said door and substantially completely enclosing an opening formed in said jamb face, a supporting plate mounted in said housing between the inner and outer walls thereof and having flanges secured to the end walls of the housing and separating said housing into two chambers, a toothed rotor rotatably mounted upon said supporting plate on the outer side thereof, a toothed ratchet on the inner side of said supporting plate and mounted for rotation with said rotor as a unit, a pawl pivotally mounted upon the inner side of said supporting plate and having an arm adapted to engage the teeth on said ratchet to hold said ratchet and rotor against rotation, spring means urging said pawl into engagement with said ratchet, the portion of said supporting plate which is adapted to project within said door having a bent flange adapted to extend generally parallel to the outer panel of said door, an actuating lever pivotally mounted upon said last-mentioned flange and having a portion engageable with said pawl to swing the latter out of latching engagement with said ratchet, manually operable means adapted to be mounted upon said outer door panel above said actuating lever, a link interconnecting said manually operable means and said lever, said housing having an integral bottom wall formed with an opening therein through which said keeper projects for engagement with the teeth on said rotor when the door is moved toward closed position.

THOMAS C. DINGMAN.
JOHN W. JAMIESON.

REFERENCES CITED

The following references are of record in the file of this patent:

UNITED STATES PATENTS

| Number | Name | Date |
|---|---|---|
| 875,747 | Streng | Jan. 7, 1908 |
| 2,156,874 | Schonitzer | May 2, 1939 |
| 2,198,548 | Marple | Apr. 23, 1940 |
| 2,270,559 | Rolph et al. | Jan. 20, 1942 |
| 2,343,605 | Wise | Mar. 7, 1944 |
| 2,362,255 | Endter | Nov. 7, 1944 |
| 2,393,147 | Cousino | Jan. 15, 1946 |
| 2,439,978 | Konchan | Apr. 20, 1948 |
| 2,477,063 | Jacobi | July 26, 1949 |
| 2,499,111 | Roethel | Feb. 28, 1950 |